US010142283B2

(12) United States Patent
Gruber et al.

(10) Patent No.: US 10,142,283 B2
(45) Date of Patent: Nov. 27, 2018

(54) METHOD, APPARATUS AND SYSTEM FOR ESTABLISHING A REAL-TIME TELECOMMUNICATION SESSION (71) Applicant: VONAGE BUSINESS INC., Atlanta, GA (US)

(72) Inventors: Alexander Gruber, Brooklyn, NY (US); Bryan Stokes, Hillsborough, NJ (US)

(73) Assignee: Vonage Business Inc., Atlanta, GA (US)

( * ) Notice: Subject to any disclaimer, the term of this patent is extended or adjusted under 35 U.S.C. 154(b) by 129 days.

(21) Appl. No.: 15/250,092

(22) Filed: Aug. 29, 2016

(65) Prior Publication Data
US 2018/0063204 A1 Mar. 1, 2018

(51) Int. Cl.
G06F 15/16 (2006.01)
H04L 29/12 (2006.01)
(Continued)

(52) U.S. Cl.
CPC ...... H04L 61/1594 (2013.01); H04L 65/1069 (2013.01); H04L 65/1093 (2013.01);
(Continued)

(58) Field of Classification Search
CPC ............. H04L 65/1073; H04L 65/1069; H04L 65/403; H04L 61/1594; H04L 67/20
(Continued)

(56) References Cited

U.S. PATENT DOCUMENTS 8,489,386 B2 7/2013 Gisby et al.
8,600,027 B1 12/2013 Doerr et al.
(Continued)

FOREIGN PATENT DOCUMENTS

CA 2771845 9/2012

OTHER PUBLICATIONS

User Guide—$O_x$—"Just Call Me"—downloaded from website http://static.o2.co.uk/www/docs/business/o2_just_call_me_quick_start_guide_march_2015.pdf, 9 pages.
(Continued)

Primary Examiner — Wing F Chan
Assistant Examiner — Joseph R Maniwang
(74) Attorney, Agent, or Firm — Moser Taboada; Joseph Pagnotta (57) ABSTRACT Methods, apparatuses and systems for establishing a telecommunication session may include receiving a plurality of communication identifiers of a first type, determining one or more communication identifiers of a second type based on, for each, its association with at least one of the communication identifiers of the first type, associating the one or more communication identifiers of the second type with an identifier of the telecommunication session, receiving a request to join the telecommunication session and bypassing an authentication action and granting the request to join the telecommunication session. Alternatively, methods, apparatuses and systems for establishing a telecommunication session may include initiating, at a time based on at least a time period associated with the telecommunication session, one or more connection requests, each connection request directed to one of the communication identifiers of the second type that is associated with the identifier of the telecommunication session.

21 Claims, 5 Drawing Sheets (51) Int. Cl.
  *H04L 29/06* (2006.01)
  *H04L 29/08* (2006.01)
(52) U.S. Cl.
  CPC ............ *H04L 65/403* (2013.01); *H04L 67/20* (2013.01); *H04L 61/106* (2013.01); *H04L 61/307* (2013.01); *H04L 61/605* (2013.01)
(58) Field of Classification Search
  USPC ........................................................ 709/205
  See application file for complete search history.

(56) References Cited

U.S. PATENT DOCUMENTS

| | | | |
|---|---|---|---|
| 8,619,960 B1 * | 12/2013 | Nguyen | H04M 3/42306 379/201.01 |
| 8,811,962 B1 | 8/2014 | Smith et al. | |
| 2003/0158900 A1 * | 8/2003 | Santos | H04M 3/567 709/205 |
| 2008/0132215 A1 * | 6/2008 | Soderstrom | H04L 12/1818 455/416 |
| 2010/0061538 A1 | 3/2010 | Coleman et al. | |
| 2010/0061539 A1 | 3/2010 | Cloran et al. | |
| 2010/0131866 A1 | 5/2010 | Nielsen et al. | |
| 2011/0075826 A1 * | 3/2011 | Block | H04M 3/565 379/142.04 |
| 2015/0195410 A1 * | 7/2015 | de Castro | H04W 8/24 455/416 |

OTHER PUBLICATIONS

"Globalmeet® for iPhone User Guide"—downloaded from website https://www.globalmeet.com/docs/GM-iPhone-User-Guide.pdf, 23 pages.

Rosenberg, et al., "SIP: Session Initiation Protocol"; Network Working Group; Request for Comments; Paper No. 3261; Jun. 2002, 252 pages.

* cited by examiner

METHOD, APPARATUS AND SYSTEM FOR ESTABLISHING A REAL-TIME TELECOMMUNICATION SESSION

BACKGROUND

Field

Embodiments of the present invention generally relate to conferencing, and specifically, to methods and systems for establishing a real-time telecommunication session without the need for authentication codes.

Description of the Related Art

Conventional methods for conferencing such as teleconferencing and video conferencing rely on either a central manager or peer-to-peer configuration. In a central manager configuration, all participant devices connect to a conference server or host central server that manages all media mixing and signal transmission between the participant devices. In such telecommunication systems, a participant is required to complete an authentication process before being granted access to a conferencing session. Such process can be time consuming and if a participant forgets or loses their access code, the user cannot participate in the conferencing session.

What is needed is a method, apparatus and system for establishing a real-time telecommunication session that enables the authentication process to be bypassed.

SUMMARY

Embodiments of the present invention generally relate to a method and system for establishing a real-time telecommunication session that enables an authentication process to be bypassed.

In some embodiments, a method for establishing a real-time telecommunication session may include receiving, using a server, a plurality of communication identifiers of a first type, where each of the plurality of communication identifiers of the first type is associated with an invitation to join the telecommunication session, determining one or more communication identifiers of a second type based on, for each, its association with at least one of the communication identifiers of the first type, associating the one or more communication identifiers of the second type with an identifier of the telecommunication session, receiving a request to join the telecommunication session and bypassing an authentication action and granting the request to join the telecommunication session based on at least a determination that the request to join the telecommunication session is associated with at least one of the communication identifiers of the second type that is associated with the identifier of the telecommunication session.

In some embodiments, an apparatus for establishing a real-time telecommunication session may include a processor and a memory coupled to the processor, the memory having stored therein a communication identifier determination module and a conferencing system module comprising instructions executable by the processor. In executing the instructions, the processor configures the apparatus to receive a plurality of communication identifiers of a first type, where each of the plurality of communication identifiers of the first type is associated with an invitation to join the telecommunication session, determine one or more communication identifiers of a second type based on, for each, its association with at least one of the communication identifiers of the first type, associate the one or more communication identifiers of the second type with an identifier of the telecommunication session, receive a request to join the telecommunication session; and bypass an authentication action and grant the request to join the telecommunication session based on at least a determination that the request to join the telecommunication session is associated with at least one of the communication identifiers of the second type that is associated with the identifier of the telecommunication session.

In some embodiments, a system for establishing a real-time telecommunication session may include a communications network providing communication between endpoint devices and the communication network and at least two endpoint devices. In such an embodiment at least one of the endpoint devices or the communication network include a processor and a memory coupled to the processor, the memory having stored therein a communication identifier determination module and a conferencing system module comprising instructions executable by the processor which configure the at least one endpoint device or communication network to receive a plurality of communication identifiers of a first type, wherein each of the plurality of communication identifiers of the first type is associated with an invitation communicated to at least one of the at least two endpoint devices to join the telecommunication session, determine one or more communication identifiers of a second type based on, for each, its association with at least one of the communication identifiers of the first type, associate the one or more communication identifiers of the second type with an identifier of the telecommunication session, receive, from at least one of the at least two endpoint devices, a request to join the telecommunication session and bypass an authentication action and grant the request to join the telecommunication session based on at least a determination that the request to join the telecommunication session is associated with at least one of the communication identifiers of the second type that is associated with the identifier of the telecommunication session.

In alternate embodiments, a method for establishing a real-time telecommunication session may include receiving, using a server, a plurality of communication identifiers of a first type, wherein each of the plurality of communication identifiers of the first type is associated with an invitation to join the telecommunication session, determining one or more communication identifiers of a second type based on, for each, its association with at least one of the communication identifiers of the first type, associating the one or more communication identifiers of the second type with an identifier of the telecommunication session, associating a time period of the telecommunication session with the identifier of the telecommunication session and initiating, at a time based on at least the time period associated with the telecommunication session, one or more connection requests, each connection request directed to one of the communication identifiers of the second type that is associated with the identifier of the telecommunication session.

In some embodiments, an apparatus for establishing a real-time telecommunication session may include a processor and a memory coupled to the processor. In one embodiment, the memory has stored therein a communication identifier determination module and a conferencing system module comprising instructions executable by the processor which configure the apparatus to receive a plurality of communication identifiers of a first type, wherein each of the plurality of communication identifiers of the first type is associated with an invitation to join the telecommunication session, determine one or more communication identifiers of a second type based on, for each, its association with at least one of the communication identifiers of the first type, associate the one or more communication identifiers of the second type with an identifier of the telecommunication session, associate a time period of the telecommunication session with the identifier of the telecommunication session and initiate, at a time based on at least the time period associated with the telecommunication session, one or more connection requests, each connection request directed to one of the communication identifiers of the second type that is associated with the identifier of the telecommunication session.

In some embodiments, a system for establishing a real-time telecommunication session may include a communications network providing communication between endpoint devices and the communication network and at least two endpoint devices. In one embodiment, at least one of the endpoint devices or the communication network include a processor and a memory coupled to the processor, the memory having stored therein a communication identifier determination module and a conferencing system module comprising instructions executable by the processor which configure the at least one endpoint device or communication network to receive a plurality of communication identifiers of a first type, wherein each of the plurality of communication identifiers of the first type is associated with an invitation to join the telecommunication session, determine one or more communication identifiers of a second type based on, for each, its association with at least one of the communication identifiers of the first type, associate the one or more communication identifiers of the second type with an identifier of the telecommunication session, associate a time period of the telecommunication session with the identifier of the telecommunication session and initiate, at a time based on at least the time period associated with the telecommunication session, one or more connection requests, each connection request directed to one of the communication identifiers of the second type that is associated with the identifier of the telecommunication session.

Other and further embodiments in accordance with the present principles are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to a methods, apparatuses and systems for establishing a real-time telecommunication session.

While the embodiments discussed herein may include devices using mobile communications, additional embodiments include fixed electronic devices (e.g., desktop computers and corded phones). One non-limiting form of mobile communications that may be used with embodiments described herein is Voice over IP (VoIP), which is utilized to establish and provide voice communications over a data network using the Internet Protocol (IP). Businesses and individuals implement VoIP by installing the necessary equipment and service (i.e., a "high speed" network or broadband connection) to access a VoIP service provider and activating this telecommunication service. Calls from a VoIP subscriber device to a destination device may be routed via a number of inter-connected networks, such as via a VoIP service provider network, mobile telephone service provider networks (e.g., 3G, Long Term Evolution (LTE)), and existing and traditional telecommunications systems that are more commonly referred to as the Public Switched Telephone Network (PSTN) or Plain Old Telephone Service (POTS).

VoIP service providers may provide mobile or desktop VoIP applications (apps) that users can install on their smartphone or other type of mobile or stationary computing devices, or may provide VoIP Telephone/Device Adaptors (TA) that can be used with traditional hardwire telephones. Such apps also include over the top (OTT) applications. OTT applications describe a category of applications or service that provides a product/service over the Internet and bypasses traditional distribution.

At least a portion of the call may be transmitted as packets over an IP network, via Wi-Fi for example, rather than over traditional channels (e.g., the voice channel on a 2G or 3G network, or the like). By transmitting voice as packet data over an IP network, these mobile apps can allow a user to make calls to another OTT client or an off-net destination. They may be used when the user is connected to a base station over the mobile operator's cell network, over a third-party's Wi-Fi access point, over WIMAX, and the like.

In the following description, the term "endpoint device" describes participant devices (e.g., end-user devices) to a telecommunication session. An endpoint device can be a device that receives an invitation to a telecommunication session, in some embodiments, from another endpoint device which schedules the telecommunication session and invites participants to the telecommunication session using one of a plurality of methods and means for communicating the invitation as described in further detail below.

In the following description, the terms "identifiers of a first type" and "identifiers of a second type" describe communication identifiers used to identify telecommunication session participants or endpoint devices. For example, communication identifiers of a first type can include a communication identifier associated with an invitation to join a telecommunication session. Communication identifiers of a second type can include a communication identifier associated with the communication identifier of the first type and are associated with a received request to join a telecommunication session.

It should be noted however that, in accordance with various embodiments of the present principles, a communication identifier of the first type and a communication identifier of the second type can comprise a same communication identifier type. For example, in various embodiments, a telephone number of a user's device can be used to invite a user to a telecommunication session. That user's same telephone number can then be identified as a communication identifier of a second type and be associated with a stored identifier for the telecommunication session. As such, when a request to join the telecommunication session is received from the user's device associated with the user's telephone number, an authentication action is bypassed and the request to join the telecommunication session is granted in accordance with the teachings of the present principles described herein.

In principle, in accordance with various embodiments of the present principles, a communication identifier of a first type is a communication identifier associated with the communication of an invitation to a telecommunication session. A communication identifier of a second type is a communication identifier associated with a received request to join the telecommunication session.

In accordance with various embodiments of the present principles, a server receives a plurality of communication identifiers of a first type, where each of the plurality of communication identifiers of the first type is associated with an invitation to join a telecommunication session. The server determines one or more communication identifiers of a second type based on, for each, an association of a communication identifier of a second type with at least one of the communication identifiers of the first type. Optionally, an identifier of telecommunication session is stored. In alternate embodiments, an identifier of the telecommunication session is referred to and may have been previously stored. Subsequently, the one or more communication identifiers of the second type are associated with the identifier of the telecommunication session. When a request to join the real-time telecommunication session is received, an authentication action is bypassed and the request to join the telecommunication session is granted based on at least a determination that the request to join the telecommunication session is associated with at least one of the communication identifiers of the second type that is associated with the identifier of the telecommunication session.

As will be described in further detail below, communication identifiers of a first type are identifiers associated with an invitation to join a telecommunication session. For example, a communication identifier of a first type can include an email address used to invite a participant to the telecommunication session. In such an embodiment, a communication identifier of a second type can be determined according to its association with the communication identifier of the first type, in this case a participant's email address used to invite the participant to the telecommunication session. That is, a communication identifier of the second type can include a telephone number associated with the email address used to invite the participant to the telecommunication session. Such an association can exist in a stored profile listing at least communication identifiers for an invited participant. In accordance with various embodiments of the present principles, such a stored profile can include an accessible address book or directory.

The one or more determined identifiers of the second type are associated with a stored identifier of the telecommunication session. When a request to join the telecommunication session is received, an authentication action is bypassed and the request to join the telecommunication session is granted when it is determined that the request to join the telecommunication session is associated with at least one of the communication identifiers of the second type associated with the identifier of the telecommunication session.

In accordance with alternate embodiments of the present principles, a start time for the telecommunication session is associated with the stored identifier of the telecommunication session. In such embodiments, one or more connection requests can be initiated to at least one of the communication identifiers of the second type that is associated with the identifier of the telecommunication session at a time based on a start time of the telecommunication session.

Figure 1:
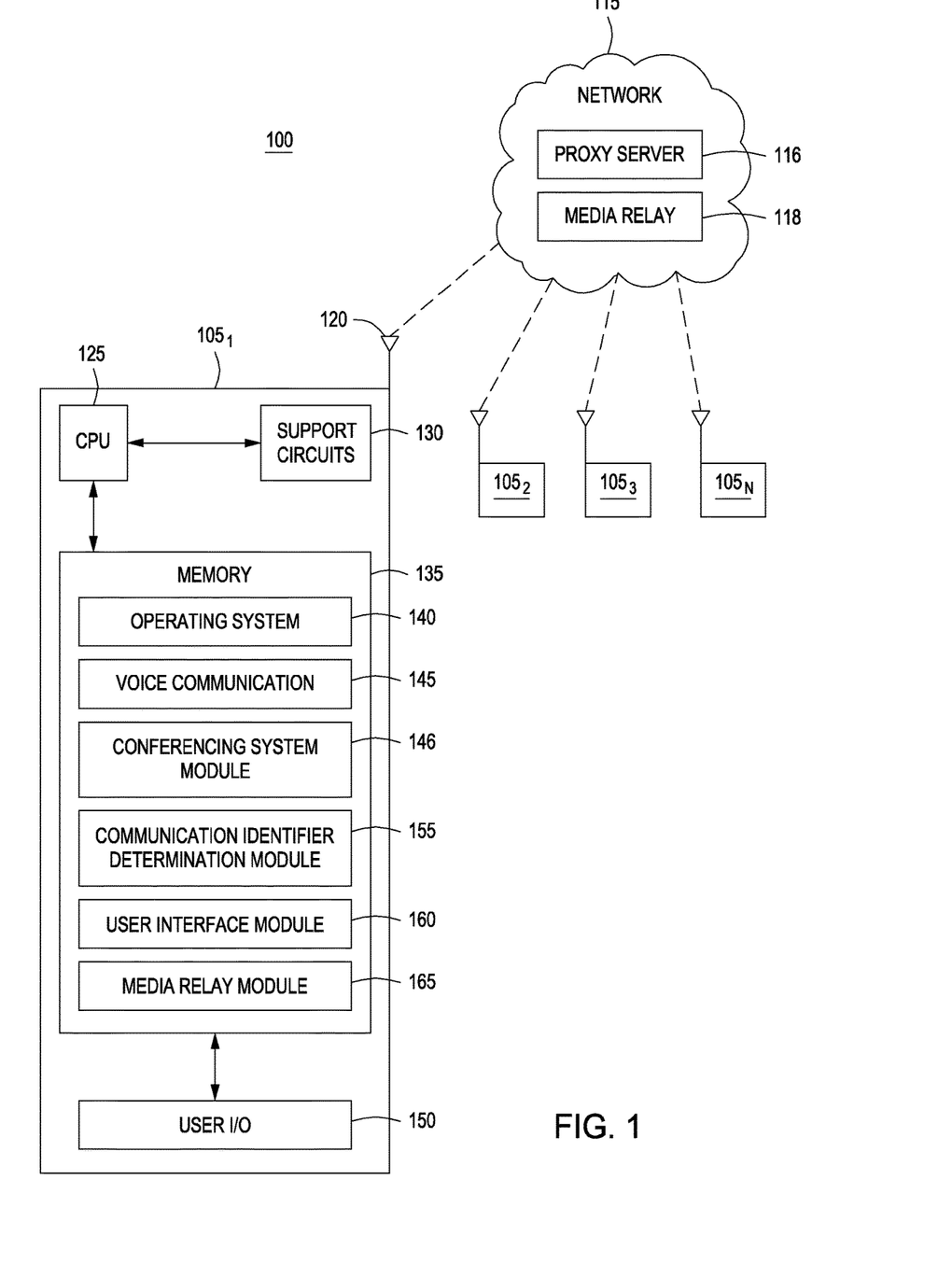
FIG. 1 depicts a high level block diagram of a communication system for establishing a telecommunication session in accordance with an embodiment of the present principles.

FIG. 1 depicts a high level schematic diagram of a communication system 100 for establishing a telecommunication session in accordance with an embodiment of the present principles. The system 100 of FIG. 1 includes user devices $105_{1-N}$ in accordance with one or more embodiments of the present principles. The participant user devices $105_{1-N}$ comprise components of a communication system 100 that enables them to communicate with each other. Participant devices $105_{1-N}$ are coupled via the communications network 115. The connection between participant user devices $105_{1-N}$ and network 115 may be wired or wireless. In some embodiments, the network 115 initially is setup using session initiation protocol (SIP) via the proxy server 116 and media relay 118. Specifically, in some embodiments, the proxy server 116 may communicate with each participant user device $105_{1-N}$ using SIP signaling. After the proxy server 116 negotiates and establishes a connection with each participant user device $105_{1-N}$, the media relay 118 coordinates and sends communication data packets via data streams between participant user devices $105_{1-N}$. The specific details and functionality of SIP can be found in the Internet Engineering Task Force (IETF) Request for Comments (RFC) Paper No. 3261 entitled, "SIP: Session Initiation Protocol" herein incorporated in its entirety by reference. SIP establishes and negotiates a session, including the modification or termination of a session. SIP uses a location-independent address system feature in which called parties can be reached based on a party's name. SIP supports name mapping and redirection allowing users to initiate and receive communication from any location. The communication identifier may be a phone number associated with one or a plurality of devices used by, or otherwise associated with, the user.

Figure 2:
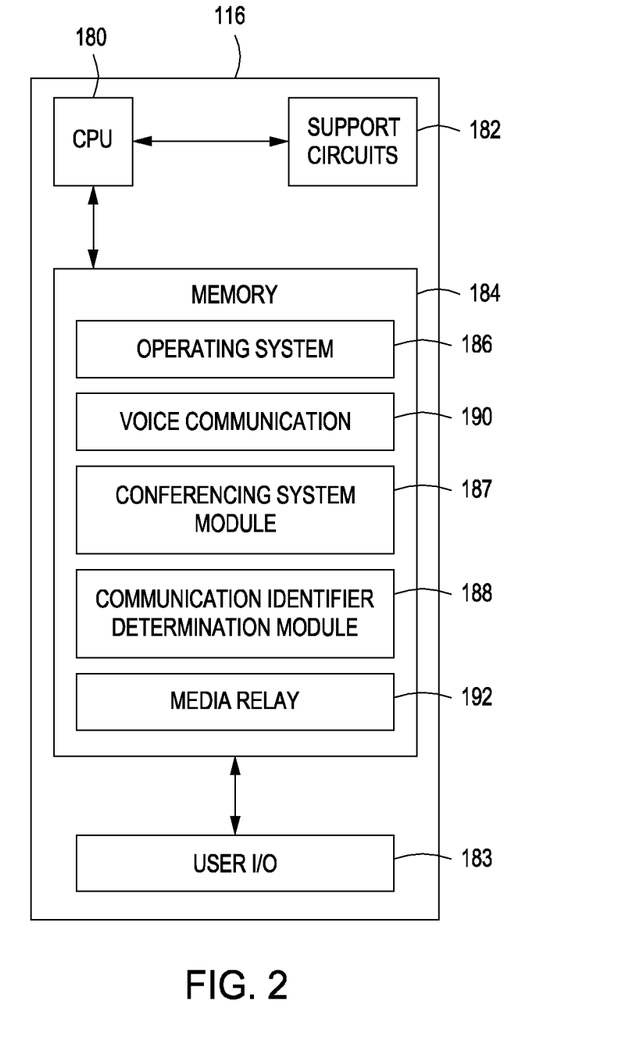
FIG. 2 depicts a high level block diagram of a proxy server in accordance with an embodiment of the present principles.

FIG. 2 depicts a high level schematic diagram of a proxy server 116 in accordance with an embodiment of the present principles. The proxy server 116 of FIG. 2 illustratively includes one or more CPUs 180, support circuits 182, input/output (I/O) interface 183 and memory 184. The memory 184 includes an operating system 186, a conferencing system module 187 and a communication identifier determination module 188 (discussed below in further detail). The operating system 186 controls the interoperability of the support circuits 182, CPU 180 and memory 184. In various embodiments in accordance with the present principles, the memory 184 of the proxy server 116 of FIG. 2 can further include a voice communication module 190 and a media relay module 192 similar to the memory 135 of the user device $105_1$ of FIG. 1.

The CPU 180 may comprise one or more commercially available microprocessors or microcontrollers that facilitate data processing and storage. The various support circuits 182 facilitate the operation of the CPU 180 and include one or more clock circuits, power supplies, cache, input/output circuits, and the like. The memory 184 comprises at least one of Read Only Memory (ROM), Random Access Memory (RAM), disk drive storage, optical storage, removable storage and/or the like.

The operating system (OS) 186 generally manages various computer resources (e.g., network resources, file processors, and/or the like). The operating system 186 is configured to execute operations on one or more hardware and/or software modules, such as Network Interface Cards (NICs), hard disks, virtualization layers, firewalls and/or the like. Examples of the operating system 186 may include, but are not limited to, LINUX, CITRIX, MAC OSX, BSD, UNIX, MICROSOFT WINDOWS, 10S, ANDROID and the like.

Referring back to FIGS. 1 and 2, the communications network 115 may be one or more networks such as Internet Protocol (IP) networks or public switched telephone networks (PSTN) used to connect the participant devices $105_{1-N}$. The participant devices $105_{1-N}$ may be electronic user devices (e.g., telephones, personal computers, laptops, smart phones, mobile phones, tablets, smart TVs, and the like).

The communications network 115 allows for participant devices (wired or wireless) to exchange data and voice communications. Since video or images captured by a camera are digitized for sending across the network 115, video calls are a form of data communication. The communications network 115 is capable of processing the sending and receiving of both voice and data streams between the participant devices $105_{1-N}$. An exemplary first participant device $105_1$ includes an antenna 120, a CPU 125, support circuits 130, memory 135, input/output (I/O) interface 150, and in some embodiments, a camera (not shown). The support circuits 130 include circuits for interfacing the CPU 125 and memory 135 with the antenna 120 and input/output (I/O) interface 150. The I/O interface 150 may include a speaker, microphone, additional camera optics, touch screen, buttons and the like for a user to interact with the first participant device $105_1$.

The memory 135 includes an operating system 140, a voice communication module 145, a conferencing system module 146, a communication identifier determination module 155, a user interface module 160, and a media relay module 165. The operating system 140 controls the interoperability of the support circuits 130, CPU 125, memory 135, and the I/O interface 150. The user interface module 160 contains instructions for the I/O interface 150 to interact with the operating system 140 such as for a graphical user interface (GUI). The voice communication module 145 may establish a communication session via cellular communication (CDMA, GSM, and the like).

The CPU 125 may comprise one or more commercially available microprocessors or microcontrollers that facilitate data processing and storage. The various support circuits 130 facilitate the operation of the CPU 125 and include one or more clock circuits, power supplies, cache, input/output circuits, and the like. The memory 135 comprises at least one of Read Only Memory (ROM), Random Access Memory (RAM), disk drive storage, optical storage, removable storage and/or the like.

The operating system (OS) 140 generally manages various computer resources (e.g., network resources, file processors, and/or the like). The operating system 140 is configured to execute operations on one or more hardware and/or software modules, such as Network Interface Cards (NICs), hard disks, virtualization layers, firewalls and/or the like. Examples of the operating system 140 may include, but are not limited to, LINUX, CITRIX, MAC OSX, BSD, UNIX, MICROSOFT WINDOWS, 10S, ANDROID and the like. Although in the embodiments of FIGS. 1 and 2, the communication identifier determination module 155, 188 and the conferencing system module 146, 187 illustratively comprise separate modules, in alternate embodiments in accordance with the present principles, the communication identifier determination module 155, 188 and the conferencing system module 146, 187 can respectively comprise a single module including all of the functionality of the individual modules. In addition, in accordance with various embodiments of the present principles, the communication identifier determination module 155, 188 and the conferencing system module 146, 187 can comprise similar functionality or share functionality or have overlapping functionality for performing any of the processes or methods described below with respect to the functionality of the present principles.

In accordance with one embodiment of the present principles, the conferencing system module 146 of a user device $105_{1-N}$ and/or the conferencing system module 187 of the proxy server 116 receive communication identifiers of a first type, where each of the communication identifiers of the first type is associated with an invitation to join a telecommunication session. In various embodiments in accordance with the present principles, communication identifiers of the first type are received from an endpoint device (e.g., user device $105_1$) that originated the invitation to join the telecommunication session. For example, in one embodiment of the present principles, a process (e.g., a process of the conferencing system module 146, 187) local or remote to the endpoint device (e.g., user device $105_1$) that originated an invitation to a telecommunication session monitors outgoing invitations and extracts from those invitations the communication identifiers (e.g., emails) used to invite participants to a telecommunication session. In such an embodiment, the process can be running, for example, on an endpoint device (e.g., mobile device, computer desktop, etc.) of the invitee or, for example, in the network 115 and/or the cloud. In accordance with an alternate embodiment of the present principles, a conferencing system module 146, 187 is included as an invitee to a telecommunication session such that a respective communication identifier determination module 155, 188 can identify the communication identifiers of the first type associated with the invitation to join the telecommunication session.

As described above, in accordance with various embodiments of the present principles, the identification of the communication identifiers of the first type is accomplished by a local process that captures outgoing invitations or alternatively by a local process that scrapes the calendar. This can be accomplished by an originator of the invitation to the telecommunication session including the conferencing system module 146, 187 in the invitation as a participant or as a resource. This enables the conferencing system module 146, 187 in conjunction with a respective communication identifier determination module 155, 188 to learn about all the invitees and the communication identifiers of the first type associated with the invitees. Alternatively, this can be accomplished by enabling access to the originator's and/or invitees' calendars so that the conferencing system module 146, 187 can scrape the data associated with the communication identifiers of the first type from the calendars. Alternatively, in accordance with various embodiments of the present principles, this can be accomplished by using the conferencing system module 146, 187 as an originator of an invitation to a telecommunication session. Once information is collected and stored as a dataset, for example in a memory associated with the conferencing system module 146, 187, the collected information can act as a polled resource for communication identifiers in future requests.

In accordance with alternate embodiments of the present principles, an information request is communicated to a third-party service, for example, via an application programming interface (API) and in response, communication identifiers of the first type are communicated to, in one embodiment, the communication identifier determination module 155, 188. As previously described, the communication identifiers of the first type can be used to communicate an invitation to endpoint devices (user devices $105_{1-N}$) to join a telecommunication session. In accordance with one embodiment of the present principles, an API call to a third-party company, like Whitepages™, can enable a retrieval of, for example a telephone number in response to sending an email address or vice versa. Also APIs made available by Salesforce™, LinkedIn™, Facebook™ and other contact management providers may enable the receipt of additional identifiers of a participant given an initial first identifier. For example, in such embodiments, if a person's name is known and communicated to a contact management provider, the contact management provider will return information such as email addresses, phone numbers, names and addresses if known. In accordance with alternate embodiments of the present principles communication identifiers of the first type can be determined by integrating with a company's active directory/LDAP/IDP system using for example an API. In various embodiments of the present principles, a third-party service can comprise a calendar service.

In accordance with various embodiments of the present principles in which an information request is communicated to a third-party service, an account associated with an entity that originated the invitation is identified by the third-party service using information communicated with the information request. In addition to returning communication identifiers of the first type in response to the information request, a third party service can also return a plurality of identifiers of events associated with the account, at least one of the events being associated with a current telecommunication session being arranged.

Referring back to FIGS. 1 and 2, the communication identifier determination module 155, 188 may further determine one or more communication identifiers of a second type based on, for each, an association with at least one of the communication identifiers of the first type. In a specific embodiment in accordance with the present principles, communication identifiers of the second type may be determined by referring to stored information lists. For example, in one embodiment a first identifier may include an email address of an invitee to a telecommunication session. The communication identifier determination module 155, 188 can then examine stored information (e.g., a contact book, a profile listing, and the like) associated with at least one of, for example, an originator of an invitation to a telecommunication session, an invitee to the telecommunication session, an organization of an originator of the telecommunication session, an organization of an invitee to the telecommunication session, or a third-party service, to make an association between the communication identifier of the first type (e.g., in the example above, an email address) and at least one communication identifier of a second type (e.g. a telephone number) associated with the communication identifier of the first type (e.g., the email address) used to communicate an invitation to the telecommunication session to an endpoint device (e.g., user device $105_{1-N}$).

In accordance with one embodiment of the present principles, software can be installed on a user device, for example on a mobile phone, desktop/laptop computer of an endpoint user device, that can access an address book stored locally on the user device for determining a communication identifier of a second type associated with at least one of the communication identifiers of the first type. In such an embodiment, such software can be implemented in and by the conferencing system module 146. Alternatively, such software can be implemented in and by the conferencing system module 187 of the proxy server 116. In various embodiments of the present principles, the software solution (i.e., implemented by the conferencing system module 146, 187) can also access address books of an organizer of a telecommunication session and/or address books of invitees to the telecommunication session and/or cloud and email contact accounts like Gmail™ Yahoo™, Exchange™ and the like, having direct access, for example, via secure APIs and interfaces.

In accordance with an alternate embodiment of the present principles, determining a communication identifier of a second type associated with at least one of the communication identifiers of the first type can be accomplished by installing an app on an end user device and granting the app access to, for example, a calendar and address book of the user. The installed app can upload the communication identifier information to a conference system or query that information locally on an end user device of an originator of an invitation to join a telecommunication session or an invitee to the telecommunication session.

Referring back to FIGS. 1 and 2, the communication identifier determination module 155, 188 may further associate the one or more communication identifiers of the second type with a stored identifier of the telecommunication session. In accordance with one embodiment of the present principles, this is accomplished by storing pairs of identifiers that would link the identifier of the second type with an identifier of the telecommunication session. In one embodiment, multiple links can be stored for each identifier and a relation can be considered as both, A is related to B and B is related to A, to find the pairs given any one value.

Subsequently, when a request to join a telecommunication session is received by, for example, the conferencing system module 146, 187, an authentication action is bypassed and access to the telecommunication session is granted based on a determination that the request to join the telecommunication session is associated with at least one of the communication identifiers of the second type that is associated with the identifier of the telecommunication session. More specifically, typically, when a request to join a telecommunication session is received, a requester is required to enter an authentication code to gain access to the telecommunication session. In contrast and in various embodiments in accordance with the present principles and as described herein, an authentication action is bypassed and access to the telecommunication session is granted if it is determined that the request to join the telecommunication session is associated with at least one of the communication identifiers of the second type that is associated with the identifier of the telecommunication session.

For example, in accordance with one embodiment of the present principles, communications identifiers of the first type can include email addresses, communication identifiers of the second type can include telephone numbers associated with the email addresses as described above, an invitation to join the telecommunication session can include a message originated via an email system and the telecommunication session can be a teleconference call. In such an embodiment in accordance with the present principles, an authentication action (i.e., request for an authentication code) is bypassed and access to the teleconference is granted if it is determined that the request to join the teleconference is being received from a telephone number that is associated with an identifier of the teleconference.

Optionally, in accordance with various embodiments of the present principles, a time period is associated with a stored identifier of the telecommunication session. In various embodiments of the present principles, such a time period can be associated by the conferencing system module 146, 187 using information available to the conferencing system module 146, 187 regarding the telecommunicating session. For example, in one embodiment in accordance with the present principles, upon connection to a conferencing service, the system queries a data store, for example in one embodiment, a cloud based conference system data store which contains a list of scheduled time-bound events. This event time, plus or minus the pre-determined buffer time, would determine when the connection is made to a telecommunication session. Alternatively, a stored identifier can be given a time allotment, which would be stored in a data store, for example a cloud based conferencing data store, that effectively whitelists that identifier for a set period of time. Alternatively, a time period can be associated with a stored identifier of the telecommunication session by an external source.

In such embodiments, when a request to join a telecommunication session is received, a time of the request to join the telecommunication session is compared with the time period associated with the stored identifier of the telecommunication session and the bypassing of the authentication action and the granting of the request to join the telecommunication session is further based on a result of the comparison. More specifically, in such embodiments in accordance with the present principles, an authentication action (i.e., request for an authentication code) is bypassed and access to a telecommunication session is granted if it is determined that the request to join the telecommunication system is being received from a communication identifier of the second type that is associated with an identifier of the telecommunication session and if the request is being received within a threshold time period of the time period associated with the stored identifier of the telecommunication session.

In various embodiments, the threshold time period can include some time period before or after the start of the telecommunication session and some time period before or after the end of the telecommunication session. For example, in one embodiment in accordance with the present principles, an invitee to a telecommunication session is allowed to join the telecommunication session X minutes before the start of the telecommunication session and all other invitees would be prevented from joining the telecommunication session X min after the start time of the telecommunication session.

In accordance with alternate embodiments of the present principles and referring back to the teachings above, a time period is associated with a stored identifier of the telecommunication session, the conferencing system module 146, 187 can initiate, at a time based on the start time, one or more connection requests, each connection request directed to one of the communication identifiers of the second type that is associated with the identifier of the telecommunication session. More specifically, in accordance with various embodiments of the present principles a connection request directed to at least one communication identifier of the second type that is associated with the identifier of the telecommunication session can be initiated by, for example, a device associated with an originator of an invitation to join the telecommunication session at a time based on at least a start time of the telecommunication session. In one embodiment a connection request to the at least one communication identifier of the second type that is associated with the identifier of the telecommunication session is initiated at a threshold time period within the start time of the telecommunication session as described above. In accordance with various embodiments of the present principles, the connection request can take the form of a telephone call, an email, a text, or any other form of communication able to be established using the determined communication identifiers of the second type. Alternatively, the connection request can be another invitation to a real-time telecommunication session.

In alternate embodiments, a connection request can be initiated using a respective communication identifier of the first type used to initially communicate an invitation to the telecommunication session.

Figure 3:
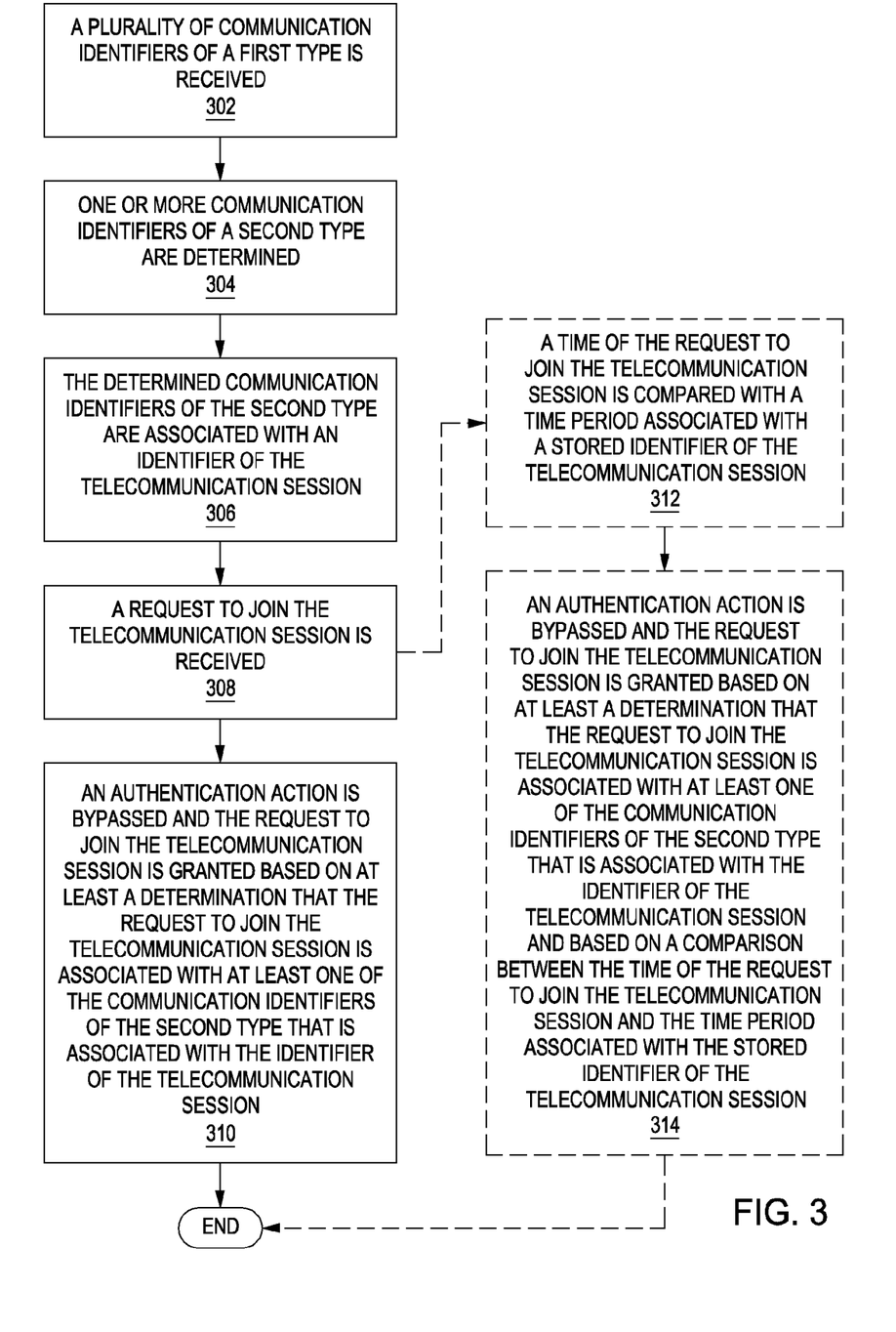
FIG. 3 depicts a flow diagram of a method for establishing a real-time telecommunication session in accordance with an embodiment of the present principles.

FIG. 3 depicts a flow diagram of a method 300 for establishing a real-time telecommunication session in accordance with an embodiment of the present principles. Method 300 begins at step 302 during which a plurality of communication identifiers of a first type is received. As describe above, in various embodiments the communication identifiers of the first type are associated with an invitation to join the telecommunication session. For example, in one embodiment, communication identifiers of the first type are received from an endpoint device that originated the invitation. In alternate embodiments, communication identifiers of the first type are received from a third-party service. The method 300 can then proceed to step 304.

At step 304, one or more communication identifiers of a second type are determined based on, for each, an association of a communication identifier of a second type with at least one of the communication identifiers of the first type. As described above, in various embodiments, communication identifiers of the second type can be determined using stored information including, at least, associations between a communication identifier of a first type and at least one communication identifier of a second type. Such stored information can include a repository of stored, aggregated contact information for at least participants of a telecommunication session. In various embodiments, such stored information can include a contact list associated with an originator of an invitation to the telecommunication session and/or a contact list not associated with the originator of the invitation to join the telecommunication session. For example, in various embodiments a contact list can include a contact book that is associated with at least an originator of the invitation to the telecommunication session, an invitee to the telecommunication session, an entity that originated the invitation to the telecommunication session, an entity associated with an invitee to the telecommunication session and/or a third-party service.

It should be further noted that such stored information can be information stored locally to a participant of the telecommunication session or remotely from a participant of the telecommunication session. For example, in one embodiment in accordance with the present principles, the stored contact information can be stored locally on an endpoint device (e.g., user device $105_{1-N}$) or remotely on a server, such as the server 116 of FIG. 1 or alternatively on a cloud-based server (not shown). Referring back to FIG. 3, the method 300 can then proceed to step 306.

At step 306, the one or more determined communication identifiers of the second type are associated with an identifier of the telecommunication session. As described above, in one embodiment an association between communication identifiers of the second type and an identifier of the telecommunication session can include a list reflecting such association that can be stored in an endpoint (e.g., user device) or at a server. It should be further noted that in various embodiment in accordance with the present principles, an identifier of the telecommunication session can be determined by an apparatus or server of the present principles such as an endpoint device (e.g., user device $105_{1-N}$) or the network server 116. Such determination can be made using information provided from a third-party service or can be determined using at least information provided with an invitation to join a telecommunication session as described above. The method 300 can then proceed to step 308.

At step 308, a request to join the telecommunication session is received. As described above, in various embodiments a request to join the telecommunication session is received by an apparatus in accordance with the present principles, such as an endpoint device (e.g., user device $105_{1-N}$) or the server 116 of FIG. 1. The method 300 can then proceed to step 310 or can alternatively proceed to alternative step 312.

At step 310, an authentication action is bypassed and the request to join the telecommunication session is granted based on at least a determination that the request to join the telecommunication session is associated with at least one of the communication identifiers of the second type that is associated with the identifier of the telecommunication session. The method 300 can then be exited.

At alternative step 312, a time of the request to join the telecommunication session is compared with a time period associated with a stored identifier of the telecommunication session. More specifically, as described above, in various embodiments a time period associated with the start time of a conferencing session is associated with an identifier of a telecommunication session. As such, when a request to join the telecommunication is received, a time of the request to join the telecommunication session is compared with the time period associated with a stored identifier of the telecommunication session. The method 300 can then proceed to alternative step 314.

At alternative step 314, an authentication action is bypassed and the request to join the telecommunication session is granted based on at least a determination that the request to join the telecommunication session is associated with at least one of the communication identifiers of the second type that is associated with the identifier of the telecommunication session and based on a comparison between the time of the request to join the telecommunication session and the time period associated with the stored identifier of the telecommunication session. For example and as described above, in one embodiment an invitee to a telecommunication session is allowed to join the telecommunication session X minutes before the start of the telecommunication session and all other invitees would be prevented from joining the telecommunication session X min after the start time of the telecommunication session. The method 300 can then be exited.

Figure 4:
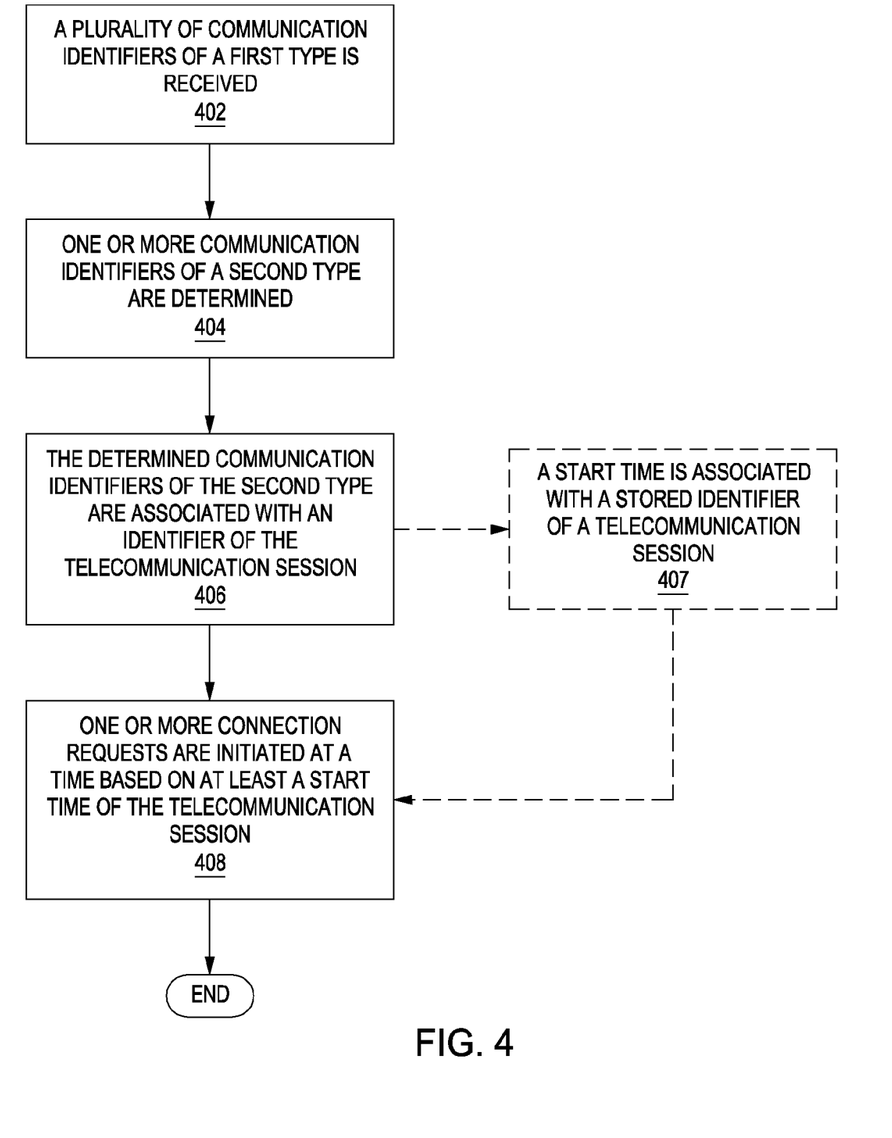
FIG. 4 depicts a flow diagram of an alternate method for establishing a real-time telecommunication session in accordance with an alternate embodiment of the present principles.

FIG. 4 depicts a flow diagram of an alternate method 400 for establishing a real-time telecommunication session in accordance with an alternate embodiment of the present principles. The method 400 of FIG. 4 begins at step 402 during which a plurality of communication identifiers of a first type is received. As describe above, in various embodiments the communication identifiers of the first type are associated with an invitation to join the telecommunication session. For example, in one embodiment, communication identifiers of the first type are received from an endpoint device that originated the invitation. In alternate embodiments, communication identifiers of the first type are received from a third-party service. The method 400 can then proceed to step 404.

At step 404, one or more communication identifiers of a second type are determined based on, for each, an association of a communication identifier of a second type with at least one of the communication identifiers of the first type. As described above, in various embodiments, communication identifiers of the second type can be determined using stored information including, at least, associations between a communication identifier of a first type and at least one communication identifier of a second type. Such stored information can include a repository of stored, aggregated contact information for at least participants of a telecommunication session. In various embodiments, such stored information can include a contact list associated with an originator of an invitation to the telecommunication session and/or a contact list not associated with the originator of the invitation to join the telecommunication session. For example, in various embodiments a contact list can include a contact book that is associated with at least an originator of the invitation to the telecommunication session, an invitee to the telecommunication session, an entity that originated the invitation to the telecommunication session, an entity associated with an invitee to the telecommunication session and/or a third-party service.

It should be further noted that such stored information can be information stored locally to a participant of the telecommunication session or remotely from a participant of the telecommunication session. For example, in one embodiment the stored contact information can be stored locally on an endpoint device (e.g., user device $105_{1-N}$) or remotely on a server, such as the server 116 of FIG. 1 or alternatively on a cloud-based server (not shown). Referring back to FIG. 4, the method 400 can then proceed to step 406.

At step 406, the one or more determined communication identifiers of the second type are associated with an identifier of the telecommunication session. As described above, in one embodiment an association between communication identifiers of the second type and an identifier of the telecommunication session can include a list reflecting such association that can be stored in an endpoint (e.g., user device) or at a server. It should be further noted that in various embodiment in accordance with the present principles, an identifier of the telecommunication session can be determined by an apparatus or server of the present principles such as an endpoint device (e.g., user device $105_{1-N}$) or the network server 116. Such determination can be made using information provided to an apparatus of the present principles from a third-party service or can be determined by an apparatus of the present principles using at least information provided with an invitation to join a telecommunication session. The method 400 can then proceed to optional step 407 or can proceed directly to step 408.

At optional step 407, a start time is associated with a stored identifier of a telecommunication session. More specifically and as described above, in at least one embodiment such a time period can be associated by the conferencing system module 146, 187 using information available to the conferencing system module 146, 187 regarding the telecommunicating session. For example, in one embodiment, upon connection to a conferencing service, the system queries a data store, for example in one embodiment, a cloud based conference system data store which contains a list of scheduled time-bound events. This event time, plus or minus the pre-determined buffer time, would determine when the connection is made to a telecommunication session. Alternatively, a stored identifier can be given a time allotment, which would be stored in a data store, for example a cloud based conferencing data store, that effectively whitelists that identifier for a set period of time. Alternatively, a time period can be associated with a stored identifier of the telecommunication session by an external source. In accordance with embodiments of the present principles, the time period associated with the stored identifier of the telecommunication session is used to identify at least a start time of the telecommunication session. The method 400 can then proceed to step 408.

At step 408, one or more connection requests are initiated at a time based on at least a start time of the telecommunication session. More specifically and as described above, a connection request directed to at least one communication identifier of the second type that is associated with the identifier of the telecommunication session can be initiated by, for example, a device associated with an originator of an invitation to join the telecommunication session at a time based on at least a start time of the telecommunication session. In accordance with one embodiment of the present principles, a connection request to the at least one communication identifier of the second type that is associated with the identifier of the telecommunication session is initiated at a threshold time period within the start time of the telecommunication session. The method 400 can then be exited.

It should be noted that the methods of FIG. 3 and FIG. 4 are not mutually exclusive. More specifically the method of FIG. 3 can be implemented to establish a telecommunication session with some participants of the telecommunication session while the method of FIG. 4 can be implemented to establish the same telecommunication session with other participants of the telecommunication session.

Figure 5:
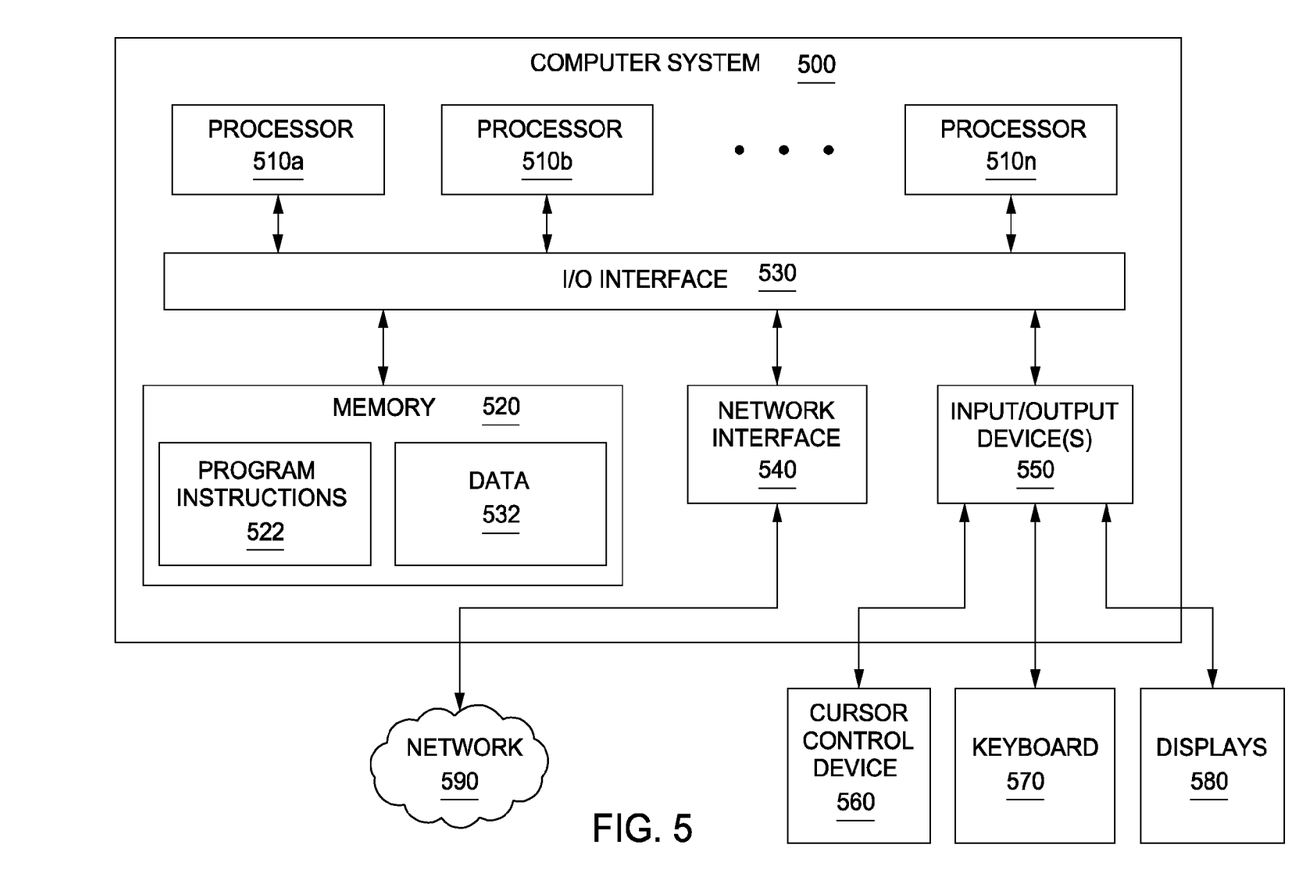
FIG. 5 depicts an exemplary diagram of a computer system for establishing a real-time telecommunication session in accordance with an embodiment of the present principles.

FIG. 5 is an exemplary diagram of a computer system 500 for establishing a telecommunication session in accordance with one or more embodiments of the present principles. The computer system 500 includes substantially similar structure comprising servers or electronic devices in the aforementioned embodiments.

Various embodiments of a method, an apparatus and a system for establishing a telecommunication session including at least authenticating users for communication sessions, as described herein, may be executed on one or more computer systems, which may interact with various other devices. One such computer system is computer system 500 illustrated by FIG. 5, which may in various embodiments implement any of the elements or functionality illustrated in FIGS. 1-3. In various embodiments, computer system 500 may be configured to implement methods described above.

The computer system 500 may be used to implement any other system, device, element, functionality or method of the above-described embodiments. In the illustrated embodiments, computer system 500 may be configured to implement methods 200 and 300 as processor-executable executable program instructions 522 (e.g., program instructions executable by processor(s) 510) in various embodiments.

In the illustrated embodiment, computer system 500 includes one or more processors 510a-510n coupled to a system memory 520 via an input/output (I/O) interface 530. Computer system 500 further includes a network interface 540 coupled to I/O interface 530, and one or more input/output devices 560, such as cursor control device 560, keyboard 570, and display(s) 580. In some embodiments, the keyboard 570 may be a touchscreen input device.

In various embodiments, any of the components may be utilized by the system to authenticate a user as described above. In various embodiments, a user interface may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, personal computer systems, mainframe computer systems, handheld computers, workstations, network computers, application servers, storage devices, a peripheral devices such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, cellular networks, Wi-Fi, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display devices, keyboards, keypads, cameras, touchpads, touchscreens, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowchart of FIGS. 2 and 3. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, smartphones, tablets, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method for establishing a telecommunication session, comprising:
   receiving, using a server, a plurality of communication identifiers of a first type, wherein each of the plurality of communication identifiers of the first type is associated with an invitation to join the telecommunication session;
   determining one or more communication identifiers of a second type based on, for each, its association with at least one of the communication identifiers of the first type;

associating the one or more communication identifiers of the second type with an identifier of the telecommunication session;
receiving a request to join the telecommunication session; and
bypassing an authentication action and granting the request to join the telecommunication session based on at least a determination that the request to join the telecommunication session is associated with at least one of the communication identifiers of the second type that is associated with the identifier of the telecommunication session.

2. The method of claim 1, wherein the plurality of communication identifiers of the first type is received from an endpoint device that originated the invitation.

3. The method of claim 1, wherein the plurality of communication identifiers of the first type is received via the invitation.

4. The method of claim 1, wherein receiving the plurality of communication identifiers of the first type comprises:
sending an information request to a third-party service via an application programming interface; and
receiving a response to the information request comprising the plurality of communication identifiers of the first type.

5. The method of claim 4, wherein the information request identifies an account associated with an entity that originated the invitation.

6. The method of claim 5, wherein the third-party service is a calendar service.

7. The method of claim 6, wherein the response to the information request comprises a plurality of identifiers of events associated with the account, and further comprising:
determining that at least one of the events is associated with the telecommunication session.

8. The method of claim 1, wherein the association of each of the communication identifiers of the second type with at least one of the communication identifiers of the first type, from which each of the communication identifiers of the second type is determined, is contained in one or more contact books.

9. The method of claim 8, wherein the one or more contact books is a contact book that is associated with an entity that originated the invitation.

10. The method of claim 8, wherein the one or more contact books comprise a plurality of contact books associated with entities that did not originate the invitation.

11. The method of claim 1, further comprising:
associating a time period with the identifier of the telecommunication session; and
comparing a time of the request to join the telecommunication session with the time period associated with the identifier of the telecommunication session;
wherein bypassing the authentication action and granting the request to join the telecommunication session is also based on a result of the comparing step.

12. The method of claim 1, wherein the communications identifiers of the first type are email addresses, the communication identifiers of the second type are telephone numbers, the invitation is a message originated via an email system, the telecommunication session is a conference call, and the authentication action is a request for an authentication code.

13. An apparatus for establishing a telecommunication session, comprising:
a processor; and
a memory coupled to the processor, the memory having stored therein a communication identifier determination module and a conferencing system module comprising instructions executable by the processor to configure the apparatus to:
receive a plurality of communication identifiers of a first type, wherein each of the plurality of communication identifiers of the first type is associated with an invitation to join the telecommunication session;
determine one or more communication identifiers of a second type based on, for each, its association with at least one of the communication identifiers of the first type;
associate the one or more communication identifiers of the second type with an identifier of the telecommunication session;
receive a request to join the telecommunication session; and
bypass an authentication action and grant the request to join the telecommunication session based on at least a determination that the request to join the telecommunication session is associated with at least one of the communication identifiers of the second type that is associated with the identifier of the telecommunication session.

14. The apparatus of claim 13, wherein said apparatus is further configured to:
associate a time period with the identifier of the telecommunication session; and
compare a time of the request to join the telecommunication session with the time period associated with the identifier of the telecommunication session;
wherein bypassing the authentication action and granting the request to join the telecommunication session is also based on a result of the comparing step.

15. The apparatus of claim 14, wherein the authentication action is bypassed and the request to join the telecommunication session is granted if the request to join the telecommunication session is associated with at least one of the communication identifiers of the second type that is associated with the identifier of the telecommunication session and if the request to join the telecommunication session is received within a threshold time period of a start of the telecommunication session.

16. A method for establishing a telecommunication session, comprising:
receiving, using a server, a plurality of communication identifiers of a first type, wherein each of the plurality of communication identifiers of the first type is associated with an invitation to join the telecommunication session;
determining one or more communication identifiers of a second type based on, for each, its association with at least one of the communication identifiers of the first type;
associating the one or more communication identifiers of the second type with an identifier of the telecommunication session;
associating a time period of the telecommunication session with the identifier of the telecommunication session; and
initiating, at a time based on at least the time period associated with the telecommunication session, one or more connection requests, each connection request directed to one of the communication identifiers of the second type that is associated with the identifier of the telecommunication session.

17. The method of claim 16, wherein the time period associated with the telecommunication session comprises a threshold time period within the start of the telecommunication session.

18. The method of claim 16, wherein the association of each of the communication identifiers of the second type with at least one of the communication identifiers of the first type, from which each of the communication identifiers of the second type is determined, is contained in one or more contact books.

19. The method of claim 18, wherein the one or more contact books is a contact book that is associated with an entity that originated the invitation.

20. The method of claim 19, wherein the one or more contact books comprise a plurality of contact books associated with entities that did not originate the invitation.

21. An apparatus for establishing a telecommunication session, comprising:
a processor; and
a memory coupled to the processor, the memory having stored therein a communication identifier determination module and a conferencing system module comprising instructions executable by the processor to configure the apparatus to:
receive a plurality of communication identifiers of a first type, wherein each of the plurality of communication identifiers of the first type is associated with an invitation to join the telecommunication session;
determine one or more communication identifiers of a second type based on, for each, its association with at least one of the communication identifiers of the first type;
associate the one or more communication identifiers of the second type with an identifier of the telecommunication session;
associate a time period of the telecommunication session with the identifier of the telecommunication session; and
initiate, at a time based on at least the time period associated with the telecommunication session, one or more connection requests, each connection request directed to one of the communication identifiers of the second type that is associated with the identifier of the telecommunication session.

* * * * *